US012417891B2

(12) United States Patent
Choi et al.

(10) Patent No.: US 12,417,891 B2
(45) Date of Patent: Sep. 16, 2025

(54) EMITTER, FIELD EMISSION ASSEMBLY AND ELECTROMAGNETIC WAVE GENERATOR INCLUDING THE SAME

(71) Applicant: AweXome Ray, Inc., Anyang-si (KR)

(72) Inventors: Hong Soo Choi, Seoul (KR); Young Bae Kim, Anyang-si (KR); Hyeongu Cho, Yongin-si (KR); Namkyu Lee, Hwaseong-si (KR); Keunsoo Jeong, Seoul (KR); Se Hoon Gihm, Seongnam-si (KR); Jiwon Choi, Ansan-si (KR)

(73) Assignee: LG Display Co., Ltd., Seoul (KR)

( * ) Notice: Subject to any disclaimer, the term of this patent is extended or adjusted under 35 U.S.C. 154(b) by 227 days.

(21) Appl. No.: 18/070,197

(22) Filed: Nov. 28, 2022

(65) Prior Publication Data

US 2024/0136142 A1 Apr. 25, 2024
US 2024/0234074 A9 Jul. 11, 2024

(30) Foreign Application Priority Data

Oct. 21, 2022 (KR) ........................ 10-2022-0136580

(51) Int. Cl.

| | |
|---|---|
| ***H01J 9/02*** | (2006.01) |
| ***H01J 1/304*** | (2006.01) |
| ***H01J 35/06*** | (2006.01) |
| ***H01J 35/08*** | (2006.01) |
| ***H01J 35/14*** | (2006.01) |

(52) U.S. Cl.
CPC ............ *H01J 35/065* (2013.01); *H01J 1/304* (2013.01); *H01J 35/08* (2013.01); *H01J 35/14* (2013.01); *H01J 2201/30469* (2013.01); *H01J 2235/06* (2013.01)

(58) Field of Classification Search
None
See application file for complete search history.

(56) References Cited

U.S. PATENT DOCUMENTS

| | | | | |
|---|---|---|---|---|
| 7,741,232 | B2 | 6/2010 | Yokoh et al. | |
| 8,395,309 | B2 | 3/2013 | Wei et al. | |
| 8,588,372 | B2 * | 11/2013 | Zou | H01J 35/065 378/138 |
| 10,643,816 | B1 | 5/2020 | Choi et al. | |
| 11,373,833 | B1 | 6/2022 | Hoff et al. | |
| 11,600,462 | B2 | 3/2023 | Gihm et al. | |
| 2004/0053780 | A1 | 3/2004 | Jiang et al. | |
| 2007/0117488 | A1 | 5/2007 | Yokoh et al. | |
| 2008/0143906 | A1 | 6/2008 | Allemand et al. | |
| 2008/0170982 | A1 | 7/2008 | Zhang et al. | |
| 2010/0181896 | A1 | 7/2010 | Lee et al. | |

(Continued)

FOREIGN PATENT DOCUMENTS

| | | |
|---|---|---|
| JP | 2004-107196 A | 4/2004 |
| JP | 2004-149996 A | 5/2004 |

(Continued)

*Primary Examiner* — Hoon K Song
(74) *Attorney, Agent, or Firm* — Seed Intellectual Property Law Group LLP

(57) ABSTRACT

An emitter, a field emission assembly, and an electromagnetic wave generator are provided, and the emitter is an emitter for emitting electrons in an electromagnetic wave generator and is in the form of a sheet in which a plurality of yarns including carbon nanotube (CNT) fibers are weaved.

20 Claims, 17 Drawing Sheets

(56) References Cited

U.S. PATENT DOCUMENTS

| | | | | |
|---|---|---|---|---|
| 2011/0181170 | A1 | 7/2011 | Gamo et al. | |
| 2012/0085970 | A1 | 4/2012 | Zhang et al. | |
| 2012/0133266 | A1 | 5/2012 | Wei et al. | |
| 2015/0380199 | A1* | 12/2015 | Liu ......................... | H01J 23/04 313/311 |
| 2018/0194950 | A1* | 7/2018 | Antoinette ........... | C08K 5/0066 |
| 2019/0287753 | A1 | 9/2019 | Weber | |
| 2022/0392730 | A1 | 12/2022 | Gihm et al. | |

FOREIGN PATENT DOCUMENTS

| | | | |
|---|---|---|---|
| JP | 2006-107932 | A | 4/2006 |
| JP | 2008-523254 | A | 7/2008 |
| JP | 2012119296 | A | 6/2012 |
| JP | 7020627 | B2 | 2/2022 |
| KR | 20110060236 | A | 6/2011 |
| KR | 10-1384100 | B1 | 4/2014 |
| KR | 10-1387700 | B1 | 4/2014 |
| TW | 202029256 | A | 8/2020 |
| TW | 202038280 | A | 10/2020 |
| WO | WO 2005001180 | A1 | 1/2005 |
| WO | WO 2012074319 | A1 | 6/2012 |

* cited by examiner

Twisted Yarn

Braided Yarn

Non Twisted Yarn (64 Fiber)

75 Twisted Yarn (64 Fiber)

150 Twisted Yarn (64 Fiber)

Braided Yarn (64 Fiber)

EMITTER, FIELD EMISSION ASSEMBLY AND ELECTROMAGNETIC WAVE GENERATOR INCLUDING THE SAME

CROSS-REFERENCE TO RELATED APPLICATION

This application claims the benefit of Korean Patent Application No. 10-2022-0136580, filed on Oct. 21, 2022, in the Korean Intellectual Property Office, the disclosure of which is incorporated herein by reference.

BACKGROUND

Technical Field

The present disclosure relates to an emitter, a field emission assembly, and an electromagnetic wave generator including the same, and more particularly, to a field emission assembly capable of uniformizing a field emission characteristic through a structure of an emitter, and an electromagnetic wave generator including the same.

Description of the Related Art

Recently, with the development of a carbon nanotube (CNT)-related technology, a technology in which a cathode of the existing X-ray tube which emits hot electrons using the existing filament is replaced with a cold cathode using CNTs, which is capable of emitting electrons due to an electric field, is being developed.

Generally, a carbon nanotube-based X-ray tube includes a cathode including CNTs, a gate for inducing electron emission, a focusing part for improving electron focusing performance, and an anode for generating electromagnetic waves (specifically, X-rays) due to collision of the emitted electrons.

In X-rays, an amount of emitted electrons, a collision speed, and a focal point size are determined according to a voltage, a geometric shape, and a position of each part, and these are factors which determine resolution and quality of a radiographic image. In particular, in the case of an emitter which is an emission source of electrons based on CNTs, uniformity and performance of field emission may depend on a shape or a bonding structure of the emitter.

The emitter may be formed into a variety of structures depending on the use of the electromagnetic wave generator in which the emitter is included. For example, electromagnetic wave generators used for breast cancer detection may require large amounts of X-rays, whereas in other specific cases, a less intense X-ray emission may be required. This is because, when the intensity of X-rays is increased, the X-rays pass through even a target to be detected and thus the target may not be detected.

In one example, many electrons are emitted from an emitter, and the emitter may be required that the electrons are uniformly emitted in a wide area rather than being concentrated and emitted at any one point of the emitter. In an electromagnetic wave generator in the related art, in order to derive such an electron emission pattern, an emitter in the form of a sheet is used sometimes.

BRIEF SUMMARY

Among emitters in the form of a sheet in the related art, there are an anisotropic two-dimensional (2D) sheet emitter in which carbon nanotubes (CNTs) are formed to be disposed with directionality, and a non-woven 2D sheet emitter in which CNTs are formed to be entangled without directionality.

However, in the former case, a field emission characteristic is varied according to an installation direction of the emitter, and in the latter case, electron emission points are non-uniformly formed within the sheet so that the sheet emitters in the related art have limitation in which uniformity of the field emission characteristics of the emitters is degraded.

In addition, as the uniformity of field emission is degraded, there is a limitation in precisely controlling a generation amount or intensity of electromagnetic waves.

In addition, the former emitter is easily torn in a direction perpendicular to the arrangement direction, and the latter emitter has the same property as a non-woven fabric to be easily torn in a specific direction so that there is a problem durability of the emitters is sharply degraded, and thus a lifetime of each emitter is varied.

One or more embodiments of the present disclosure addresses the various technical problems in the related art including the problems identified above.

An aspect of the present disclosure is to provide an emitter capable of improving uniformity of a field emission characteristic, a field emission assembly and a lifetime of an electromagnetic wave generator, and an electromagnetic wave generator including the same.

Another aspect also provides an emitter capable of more precisely controlling a generation amount or intensity of electromagnetic waves, a field emission assembly, and an electromagnetic wave generator including the same.

Still another aspect also provides an emitter with improved durability and a consistent lifetime, a field emission assembly, and an electromagnetic wave generator including the same.

According to an aspect, there is provided an emitter for emitting electrons in an electromagnetic wave generator. The emitter may be in the form of a sheet in which a plurality of yarns including carbon nanotube (CNT) fibers are weaved.

In this way, it is possible to improve uniformity of a field emission characteristic in the emitter.

In addition, due to the uniformity of the field emission, controlling of a generation amount or an intensity of electromagnetic waves may be more precisely performed.

In addition, durability of the emitter may be improved, and thus the emitter, a field emission assembly, and an electromagnetic wave generator including the same may each have a consistent lifetime.

In addition, the plurality of yarns may be braided yarns.

In addition, the braided yarn may be formed by braiding a plurality of the primary twisted yarns, and the primary twisted yarn may be formed by twisting a plurality of CNT fibers.

In addition, the braided yarn may be formed by braiding a plurality of secondary twisted yarns, the secondary twisted yarn may be formed by twisting a plurality of primary twisted yarns, and the primary twisted yarn may be formed by twisting a plurality of CNT fibers.

In addition, each of the plurality of yarns may be a twisted yarn.

In addition, the twisted yarn may be the primary twisted yarn formed by twisting a plurality of CNT fibers.

In addition, the twisted yarn may be the secondary twisted yarn formed by twisting primary twisted yarns with each other, and the primary twisted yarn may be formed by twisting a plurality of CNT fibers.

According to another aspect, there is provided a field emission assembly including an emitter configured to emit electrons, and a holder configured to fix the emitter. The emitter may be in the form of a sheet in which a plurality of yarns including carbon nanotube (CNT) fibers are weaved.

In addition, the emitter may include an electron emission portion which is a region spread on a plane perpendicular to an electron emission direction.

In addition, the holder may include a seating part on which the emitter is seated and fixing parts disposed on both sides of the seating part, the emitter may include the electron emission portion which is a region spread on a plane perpendicular to the electron emission direction and side portions formed on both sides of the electron emission portion, the electron emission portion may be seated on a front surface of the seating part in the electron emission direction, and the side portions may be disposed in gaps formed between the seating part and the fixing parts while surrounding the seating part.

In addition, the front surface of the seating part in the electron emission direction may be perpendicular to the electron emission direction.

In addition, the field emission assembly may further include coupling members configured to pass through the fixing parts in a lateral direction, and the emitter may be fixed to the holder by pressurizing the side portions by the coupling members and side surfaces of the seating part.

According to still another aspect, there is provided an electromagnetic wave generator including a field emission assembly including an emitter configured to emit electrons and a holder configured to fix the emitter, and an anode in which electrons emitted from the field emission assembly collide to generate electromagnetic waves. The emitter may be in the form of a sheet in which a plurality of yarns including carbon nanotube (CNT) fibers are weaved.

In addition, the emitter may include an electron emission portion extending on a plane perpendicular to a direction toward the anode.

In addition, the electromagnetic wave may have a wavelength ranging from 0.001 nm to 10 nm.

Additional aspects of example embodiments will be set forth in part in the description which follows and, in part, will be apparent from the description, or may be learned by practice of the disclosure.

BRIEF DESCRIPTION OF THE SEVERAL VIEWS OF THE DRAWINGS

These and/or other aspects, features, and advantages of the disclosure will become apparent and more readily appreciated from the following description of example embodiments, taken in conjunction with the accompanying drawings of which.

DETAILED DESCRIPTION

Figure 1:
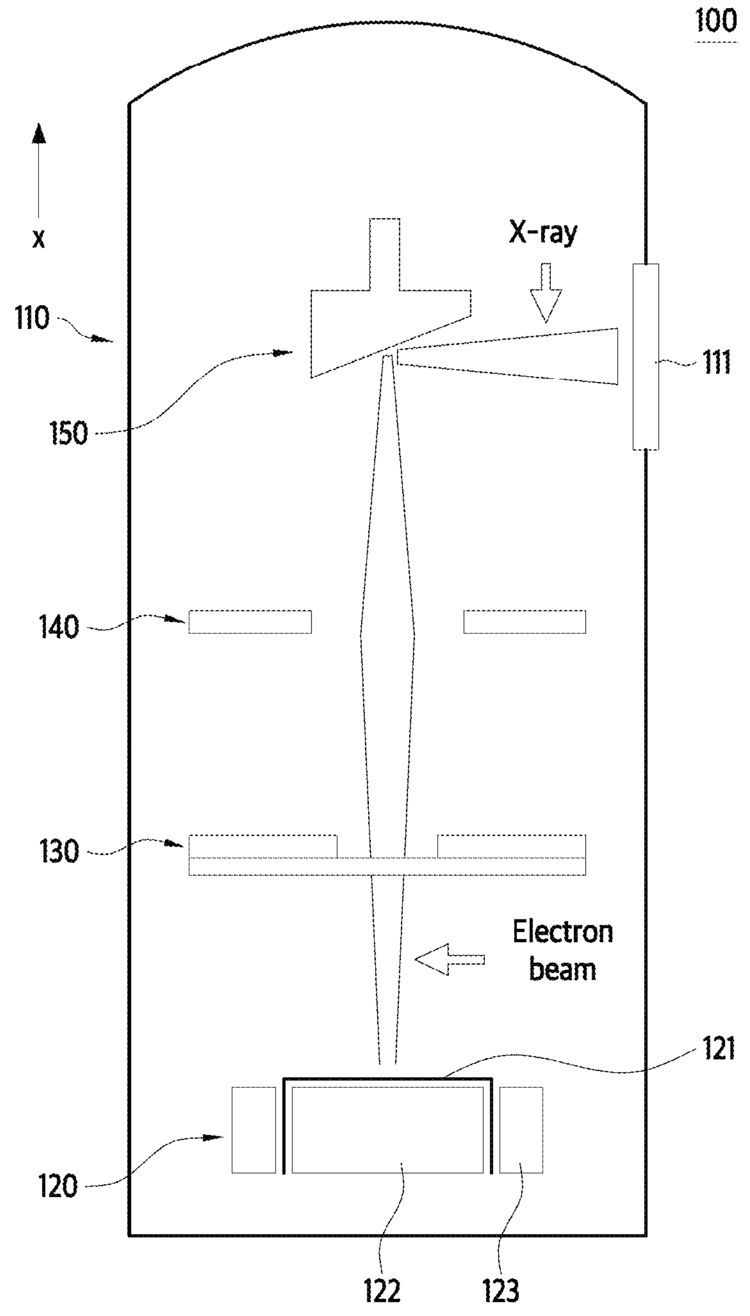
FIG. 1 is a conceptual diagram illustrating an electromagnetic wave generator including a field emission assembly according to one example embodiment of the present disclosure.

The terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

As used herein, suffixes "module" and "portion" for a component of the present disclosure are used or interchangeably used solely for ease of preparation of the specification, and do not have different meanings and each of them does not function by itself. Further, regarding the description of the example embodiments of the present disclosure, the detailed description of the related known technologies may be omitted when such description is determined to possibly confuse the essence of the example embodiments included in the present disclosure. Further, the accompanying drawings are merely to make it easier to understand the example embodiments included in the present disclosure and the technical idea of the present disclosure is not limited thereto, and they should be construed to include all of modification, equivalence and replacement involved in the idea and the technical scope of the present disclosure.

The terms including ordinal numbers such as "first" and "second" may be used to describe different constituent elements, which are not limited thereto. The terms are used only for the purpose of distinguishing one component from another component.

When a component is referred to as being "connected" or "coupled" to another component, the component may be directly connected or coupled to another component, but it should be understood that sill another component may be present between the component and another component. On the contrary, when a component is referred to as being "directly connected" or "directly coupled" to another, it should be understood that still another component may not be present between the component and another component.

Unless the context clearly dictates otherwise, the singular form includes the plural form.

As used herein, the term "comprising" or "having" is intended to indicate that there may be the features, numbers, steps, operations, components, parts or a combination thereof, disclosed in this disclosure, but should not be understood as excluding the case that there is one or more of other features, numbers, steps, operations, components, parts or a combination thereof, or the possibility of adding the same.

The expression "at least one of A, B, and C" may include the following meanings: A alone; B alone; C alone; both A and B together; both A and C together; both B and C together; and all three of A, B, and C together.

Example embodiments of the present disclosure will be fully described in a detail below which is suitable for implementation by those skilled in the art with reference to the accompanying drawings. However, the present disclosure may be implemented in various different forms, and thus it is not limited to example embodiments to be described herein.

Hereinafter, example embodiments of the present disclosure will be described in detail with reference to the accompanying drawings.

FIG. 1 is a conceptual diagram illustrating an electromagnetic wave generator including a field emission assembly according to one example embodiment of the present disclosure.

An electromagnetic wave generator 100 according to a first example embodiment of the present disclosure may include a housing 110, a field emission assembly 120, a gate electrode 130, a focusing part 140, and an anode 150. However, some of these components may be omitted and implemented, and additional components are not excluded.

Hereinafter, an electron emission direction x may be understood as a direction from the field emission assembly 120 toward the anode 150, that is, an upward direction based on FIGS. 1 to 3.

Referring to FIG. 1, the electromagnetic wave generator 100 may include the housing 110. The housing 110 may accommodate components such as the field emission assembly 120, the gate electrode 130, and the anode 150. An interior of the housing 110 may be maintained in a vacuum state or may be maintained close to a vacuum state.

An irradiation part 111 may be provided in the housing 110. Electromagnetic waves generated from the anode 150 may be emitted to the outside of the housing 110 through the irradiation part 111. However, alternatively, the housing 110 may be entirely formed of a transparent material such as glass so that electromagnetic waves generated from the anode 150 may pass therethrough. In this case, a separate irradiation part 111 may not be provided. In addition, when an intensity of the generated electromagnetic waves is strong, since the electromagnetic waves may pass through the opaque material, the housing 110 may be formed of an opaque material without providing the irradiation part 111.

The electromagnetic wave generator 100 may include the field emission assembly 120. The field emission assembly 120 may be a portion from which electrons are emitted due to an electric field. The field emission assembly 120 may serve as a cathode to which a positive voltage is applied.

The field emission assembly 120 may include an emitter 121 for emitting electrons, and a holder 122 for fixing the emitter 121. A detailed structure of the field emission assembly 120 will be described in detail below with reference to FIGS. 2 to 5.

The field emission assembly 120 of the electromagnetic wave generator 100 according to one example embodiment of the present disclosure may be a cold cathode. Specifically, in the electromagnetic wave generator 100 according to one example embodiment of the present disclosure, electrons included in the emitter 121 may be emitted by a voltage applied between the field emission assembly 120 and the gate electrode 130 without separately applying heat to the emitter 121.

The electromagnetic wave generator 100 may include the gate electrode 130. The gate electrode 130 may be disposed between the emitter 121 and the anode 150. More specifically, the gate electrode 130 may be disposed in a region between the emitter 121 and the anode 150 to be closer to the emitter 121.

The gate electrode 130 may induce electron emission from the emitter 121. Electrons included in the emitter 121 may be emitted due to a voltage applied between the gate electrode 130 and the emitter 121. In some embodiments, the gate electrode 130 may preferentially serve to withdraw electrons from the emitter 121.

However, the present disclosure is not limited thereto, and the electromagnetic wave generator 100 may not include the gate electrode 130. In this case, electrons included in the emitter 121 may be emitted due to a voltage applied between the focusing part 140, which will be described below, or the anode 150 and the field emission assembly 120.

The electromagnetic wave generator 100 may include the focusing part 140. The focusing part 140 may be disposed between the gate electrode 130 and the anode 150 or between the field emission assembly 120 and the anode 150.

As a voltage is applied, the focusing part 140 may focus an electron beam passing through the gate electrode 130. The focusing part 140 may be referred to as a lens. In addition, the focusing part 140 may further accelerate the electron beam passing through the gate electrode 130. Specifically, when a voltage is applied between the focusing part 140 and the gate electrode 130, the electrons passing through the gate electrode 130 may be accelerated due to an electric field formed by the voltage applied between the focusing part 140 and the gate electrode 130. As described above, the type of the electromagnetic wave generator 100 provided with the focusing part 140 may be understood as a triode type generator.

However, the present disclosure is not limited thereto, and when the focusing performance of the gate electrode 130 itself is good or excellent, the focusing part 140 may not be provided. As described above, the type of the electromagnetic wave generator 100 not provided with the focusing part 140 may be understood as a diode type generator.

The electromagnetic wave generator 100 may include the anode 150. The anode 150 may be disposed at a side opposite to the field emission assembly 120. The anode 150 may be disposed behind the gate electrode 130 and/or the focusing part 140 in a propagation direction of the electron beam. The anode 150 is a portion to which a higher voltage is applied when compared to the cathode including the gate electrode 130 and/or the field emission assembly 120 and may be referred to as an anode or referred to as a target in the sense that an electron beam collides.

Electromagnetic waves may be formed in the anode 150. Specifically, after the electron beam emitted from the emitter 121 is accelerated while passing through the gate electrode 130 and/or the focusing part 140, the electron beam may collide with the anode 150, and in this case, the electron beam may generate electromagnetic waves such that a material constituting the anode 150 is excited by the electron beam and then returned to its original state.

The electromagnetic wave emitted from the electromagnetic wave generator 100 may have a wavelength ranging from 0.001 nm to 10 nm. For example, the electromagnetic wave generator 100 may emit X-ray having a wavelength ranging from 0.001 nm to 10 nm. More specifically, the electromagnetic wave generator 100 may emit X-ray having a wavelength ranging from 0.01 nm to 10 nm.

Figure 2:
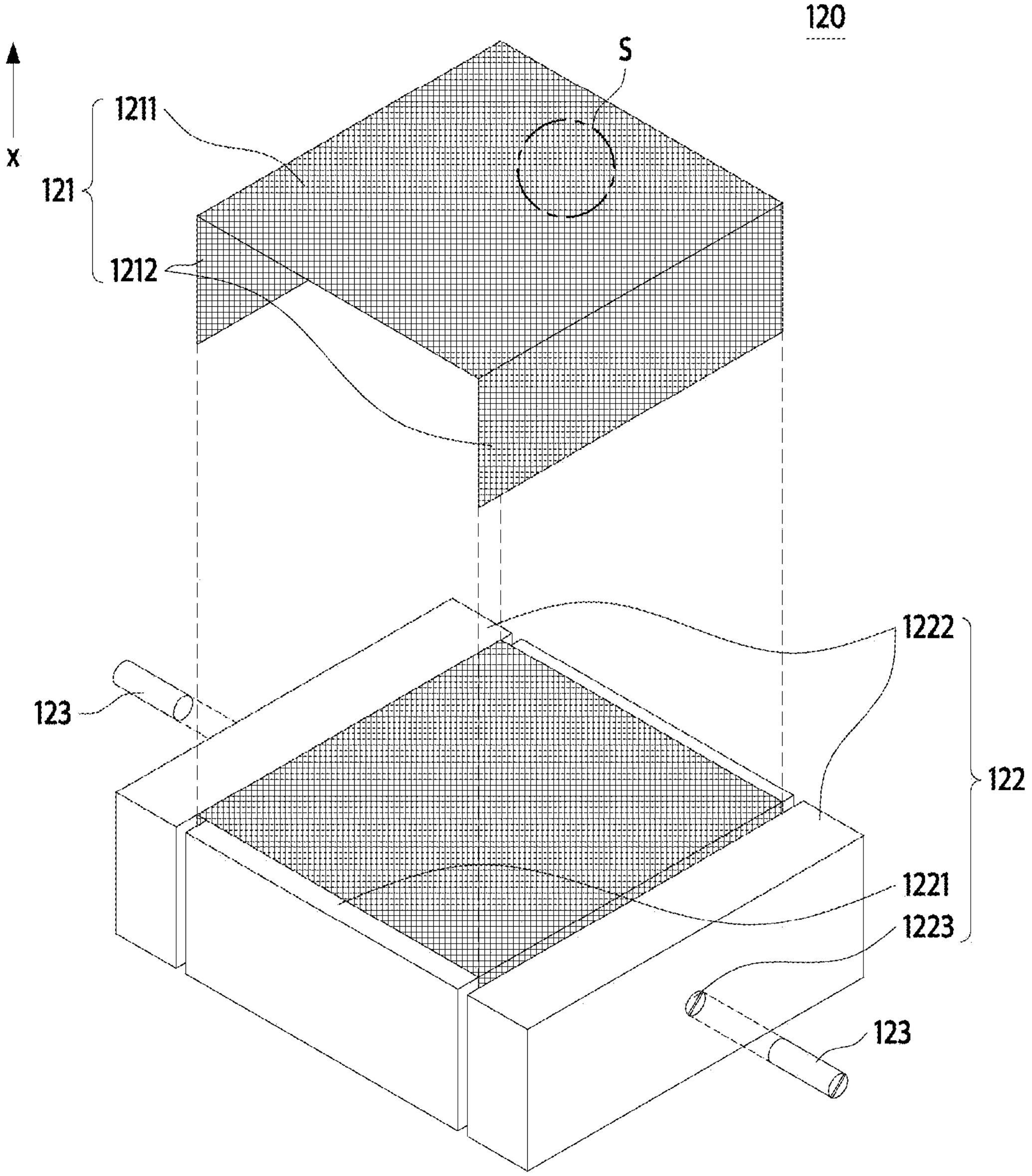
FIG. 2 is an exploded perspective view illustrating the field emission assembly according to one example embodiment of the present disclosure.
Figure 4:
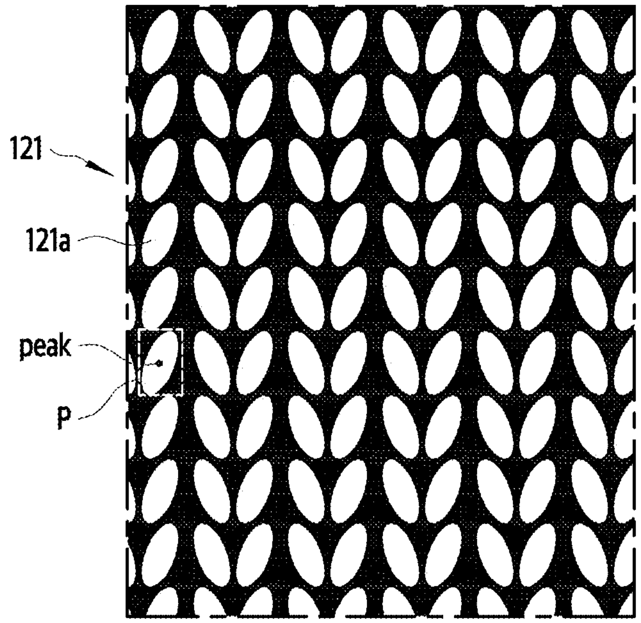
FIGS. 4 and 5 are enlarged views illustrating portion S of FIG. 2.
Figure 5:
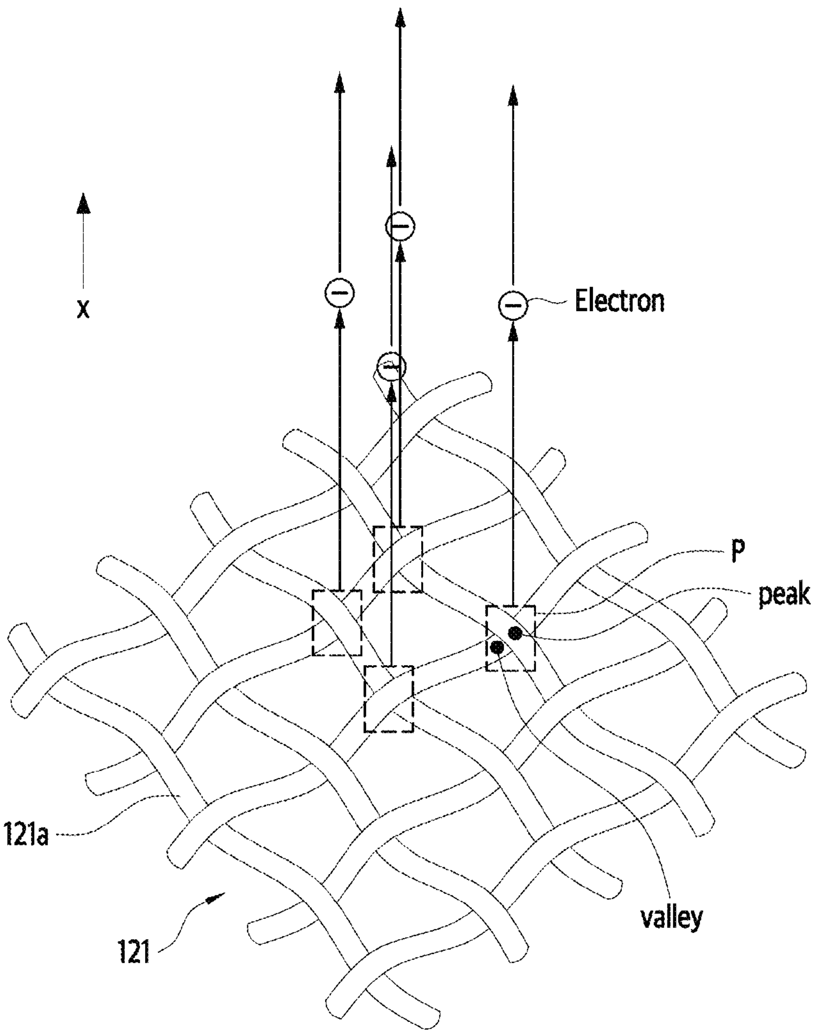

FIG. 2 is an exploded perspective view illustrating the field emission assembly according to one example embodiment of the present disclosure. FIG. 3 is a cross-sectional view illustrating the field emission assembly according to one example embodiment of the present disclosure. FIGS. 4 and 5 are enlarged views illustrating portion S of FIG. 2.

The field emission assembly 120 according to one embodiment of the present disclosure may include the emitter 121 and the holder 122, but may be implemented except for some of them, and does not exclude additional components.

Referring to FIGS. 2 and 5, the field emission assembly 120 may include the emitter 121. The emitter 121 may be fixed to the holder 122. The emitter 121 may be electrically conducted by coming into contact with the holder 122. When an electric field is applied to the electromagnetic wave generator 100, electrons may move to the emitter 121 through the holder 122 and then may be emitted from the emitter 121. The emitter 121 may include CNT fibers through which electrons may easily move. However, the present disclosure is not limited thereto, and the emitter 121 may be formed of various materials capable of emitting electrons.

The emitter 121 may be in the form of a sheet. Since the emitter 121 is formed in the form of a sheet, a plurality of electron emission points P may be formed so that a large amount of electromagnetic waves may be generated. In addition, since the emitter 121 is formed in the form of a sheet, the electron emission points P may be widely distributed so that electrons may not be concentrated and emitted at any one point of the emitter 121 and may be evenly emitted in a wide area. In this way, electromagnetic waves having weak intensities may be generated. In summary, a large amount of electromagnetic waves having weak intensities may be generated through the emitter 121 in the form of a sheet. The emitter 121 in the form of a sheet may be used in a specific field, such as breast cancer detection, requiring a large amount of electromagnetic waves having weak intensities.

Referring to FIG. 5, the emitter 121 may include a plurality of yarns 121*a*. Specifically, the emitter 121 may be formed of a plurality of yarns 121*a* including CNT fibers. The yarn 121*a* may be a linear material formed by gathering CNT fibers. A formation method of the yarn 121*a* will be described in detail with reference to FIGS. 6A, 6B and 7A to 7D.

Referring to FIGS. 4 and 5, the emitter 121 may be formed by weaving a plurality of yarns 121*a*. Specifically, the emitter 121 may be in the form of a sheet in which a plurality of yarns 121*a*, which are linearly formed, are weaved to each other. In this way, uniformity of electrical and mechanical properties of the emitter 121 may be improved, and further, the electrical and mechanical properties may be strengthened.

Specifically, when the plurality of yarns 121*a* are weaved, the emitter 121 in the form of a sheet may have a constant texture, and thus electron emission points P may be uniformly distributed on the sheet so that uniformity of the field emission characteristics may be improved.

In addition, the electron emission point P may be formed in a portion where the linear yarns 121*a* intersect with each other. Since the plurality of yarns 121*a* are provided in the form of a regularly weaved sheet, it is possible to remove an element overlapping the electron emission point P to hinder electron emission in the electron emission direction x. That is, since the plurality of yarns 121*a* are regularly weaved, all the electron emission points P, which are portions where the linear yarns 121*a* intersect with each other, may be exposed to a front side in the electron emission direction x. In this way, the electron emission may be performed more smoothly so that the field emission characteristic may be enhanced.

In addition, when the plurality of yarns 121*a* are weaved, structural unity may be secured between the manufactured emitters 121 so that uniformity of mechanical properties of the emitters 121 may be improved. In this way, consistency in the lifetimes of the field emission assembly 120 and the electromagnetic wave generator 100 may be secured. In addition, when manufacturing the field emission assembly 120, since errors due to differences in the mechanical properties may be reduced, the uniformity of the field emission characteristics may also be improved.

In addition, when the plurality of yarns 121*a* are weaved, a structure of the emitter 121 may be strengthened so that the durability of the emitter 121, the field emission assembly 120, and the electromagnetic wave generator 100 may be improved.

The emitter 121 may be weaved in a variety of ways. For example, the emitter 121 may be weaved in various methods, such as plain weaving, twill weaving, and satin weaving. That is, the emitter 121 may be formed without being limited to any specific weaving method as long as a regular texture may be formed. The emitter 121 formed by weaving may have the form of a thin and wide sheet, and rigidity thereof may slightly varied according to the weaving method.

Weaving may mean that a tissue structure of the plurality of yarns 121*a* itself may have the form of a sheet without the addition of an additional material or physical/chemical processing. However, through the addition of an additional material or physical/chemical processing, as necessary, the sheet structure may be further strengthened.

Due to the feature of weaving formation, the emitter 121 may include a point or region disposed relatively forward based on the electron emission direction x and a point or region disposed backward based on the electron emission direction x. The point or region disposed relatively forward may include a peak, and the point or region disposed relatively backward may include a valley. The peak and the valley may be formed at portions where the yarns 121*a* intersect with each other. An electron emission point P may be formed at a portion where the yarns 121*a* intersect with each other, and the electron emission point P may be understood to correspond to the peak. The portions where the peak and the valley are formed may be formed to be thicker than other portions so that many electrons may be concentrated, and electron emission may be facilitated through a shape of the peak. The plurality of yarns 121*a* are weaved in a regular texture, and thus a plurality of peaks and valleys have a regular distribution so that uniformity of the field emission characteristics may be improved.

Figure 3:
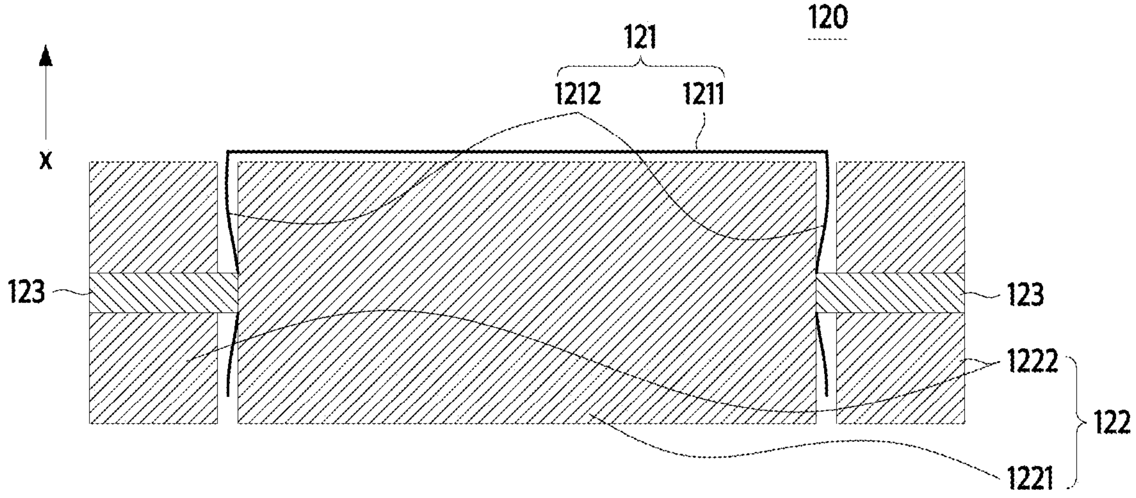
FIG. 3 is a cross-sectional view illustrating the field emission assembly according to one example embodiment of the present disclosure.

Referring to FIGS. 2 and 3, the emitter 121 may include an electron emission portion 1211. The electron emission portion 1211 may refer to a direct region emitting electrons in a width direction of the emitter 121 and may be a central region of the emitter 121 in a state of being mainly spread out in a plane. The electron emission portion 1211 is not defined only with the emitter 121 and may be specified in a state of being coupled to the holder 122. The electron emission portion 1211 may be disposed on a front surface of a seating part 1221 of the holder 122 the electron emission direction x. When the emitter 121 is fixed to the holder 122, the electron emission portion 1211 may be exposed to the outside of the holder 122. When an electric field is applied to the electron emission portion 1211, electrons may be emitted from the electron emission portion 1211.

The electron emission portion 1211 may be a region spread out on a plane in the emitter 121 perpendicular to the electron emission direction x. That is, based on FIG. 1, the electron emission portion 1211 may be a portion spread out on a plane of the emitter 121 perpendicular to a direction toward the anode 150 shown in FIG. 1. The electron emission portion 1211 may be a portion disposed on the front surface of the seating part 1221 the electron emission direction x, which is formed on a plane perpendicular to the electron emission direction x. When an electric field is applied to an interior of the electromagnetic wave generator 100, a potential may be formed on the electron emission portion 1211 of the emitter 121. In this case, when the electron emission portion 1211 is formed on a plane perpendicular to the electron emission direction x, potentials applied to the electron emission points P formed in the electron emission portion 1211 may be the same, and accordingly, it is possible to prevent the electrons from being emitted by being focused on any one portion of the emitter 121.

The emitter 121 may include side portions 1212. The side portions 1212 may be formed on both sides of the electron emission portion 1211. The side portions 1212 may be portions extending from the both sides of the electron emission portion 1211. When the emitter 121 is fixed to the holder 122, the side portions 1212 may be portions not exposed to the outside. The emitter 121 may be fixed to the holder 122 by the side portions 1212.

The side portions 1212 may be disposed in gaps formed between the seating part 1221 and fixing parts 1222 while surrounding the seating part 1221 of the holder 122. When the emitter 121 is fixed to the holder 122, the side portions 1212 may be understood as portions extending in a direction opposite to the electron emission direction x from edges of the both sides of the electron emission portion 1211. The side portions 1212 may extend to at least a region laterally overlapping coupling holes 1223 formed in the fixing parts 1222. The emitter 121 may be fixed to the holder 122 by being pressurized by side surfaces of the seating part 1221 and coupling members 123 to which the side portions 1212 pass through the coupling holes 1223 to be coupled.

Referring to FIG. 5, an electron emission point P may be formed in the emitter 121. The electron emission point P may be a portion where linear yarns 121*a* intersect with each other in the emitter 121 in which a plurality of yarns 121*a* are weaved. Specifically, a portion where the yarns 121*a* intersect may be formed to be thicker than a portion where the yarns 121*a* do not intersect, and accordingly, when an electric field is applied to the emitter 121, electrons may be easily concentrated in the portion where the yarns 121*a* intersect. In addition, a peak may be formed in the portion where the yarns 121*a* intersect with each other, and electron emission may be facilitated through a shape of the peak. In this way, electrons may be easily concentrated in the portion where the yarns 121*a* intersect and be easily emitted so that the portion where the yarns 121*a* intersect may become the electron emission point P. A peak of one of the two intersecting yarns 121 may be formed due to a relative arrangement with a valley of the other yarn 121 disposed backward in the electron emission direction x.

Since the emitter 121 is formed by weaving a plurality of yarns 121*a*, the electron emission points P may be formed at a constant density. Through the above structure, electrons may be uniformly formed in the entire region of the electron emission portion 1211 so that the uniformity of the field emission characteristics may be improved.

Referring to FIGS. 2 and 3, the field emission assembly 120 may include the holder 122. The holder 122 may fix the emitter 121.

The holder 122 may be formed of an electrically conductive material capable of conducting electricity. Specifically, the holder 122 may be made of a material having electrical conductivity and mechanical strength that is not deformed by repulsive forces of electrons accumulated in the field emission assembly 120. For example, the holder 122 may be made of one or more materials selected from the group consisting of tungsten, zinc, nickel, copper, silver, aluminum, gold, platinum, tin, stainless steel, and conductive ceramic. When an electric field is applied to the field emission assembly 120, electrons may move to the emitter 121 through the holder 122 formed of an electrically conductive material and then may be emitted to the outside of the emitter 121.

The holder 122 may include the seating part 1221. The emitter 121 may be seated on the seating part 1221. Specifically, the electron emission portion 1211 of the emitter 121 may be disposed on the front surface of the seating part 1221 in the electron emission direction x, and the side portions 1212 of the emitter 121 may be disposed to surround the seating part 1221. In this case, the side portions 1212 of the emitter 121 may be disposed inside the gaps formed between the seating part 1221 and the fixing parts 1222.

The front surface of the seating part 1221 in the electron emission direction x may be perpendicular to the electron emission direction x. Since the electron emission portion 1211 in the form of a sheet is disposed in close contact with the front surface of the seating part 1221 in the electron emission direction x, the electron emission portion 1211 may also be perpendicular to the electron emission direction x. In this way, when an electric field is applied to the electromagnetic wave generator 100, a uniform electric potential may be formed in the electron emission portion 1211 so that the uniformity of the field emission characteristics may be improved.

The holder 122 may include the fixing parts 1222. The fixing parts 1222 may be disposed on both sides of the seating part 1221. Gaps may be formed between the seating part 1221 and the fixing parts 1222, and the side portions 1212 of the emitter 121 may be disposed inside the gaps.

The fixing parts 1222 may include the coupling holes 1223. The coupling holes 1223 may be formed to pass through side surfaces of the fixing parts 1222 in a lateral direction. The coupling members 123 may be coupled to the coupling holes 1223.

The field emission assembly 120 may include the coupling members 123. The coupling members 123 may be coupled by passing through the coupling holes 1223 formed in the fixing parts 1222. The coupling members 123 may fix the emitter 121 to the holder 122. For example, screw threads may be formed on inner surfaces of the coupling holes 1223 and outer surfaces of the coupling members 123, respectively, and the coupling members 123 may be screw-coupled to the coupling holes 1223.

Specifically, when the coupling members 123 are coupled to the coupling holes 1223 formed in the fixing parts 1222, ends of the coupling members 123 may pressurize the side surfaces of the seating part 1221. In this case, the side portions 1212 of the emitter 121 may be disposed between the ends of the coupling members 123 and the side surfaces of the seating part 1221 to be fixed to the holder 122 in such a way of being pressurized by the ends of the coupling members 123 and the side surfaces of the seating part 1221.

Alternatively, the emitter 121 may be fixed to the holder 122 in a variety of ways. For example, the side portions 1212 of the emitter 121 may be directly pressurized and fixed by the seating part 1221 and the fixing parts 1222. Specifically, instead of the ends of the coupling members 123 being terminated on the side surfaces of the seating part 1221, coupling grooves are also formed on the side surfaces of the seating part 1221 so that the coupling members 123 may be fastened to the seating part 1221 after passing through the fixing parts 1222. In this case, when the coupling members 123 are tightened, a width of each gap may be reduced as a distance between the seating part 1221 and the fixing parts 1222 is decreased. When the coupling members 123 are tightened in a state in which the side portions 1212 of the emitter 121 are disposed inside the gaps, the side portions 1212 of the emitter 121 may be pressurized and fixed by the side surfaces of the seating part 1221 and the side surfaces of the fixing parts 1222.

Alternatively, the holder 122 does not include the fixing parts 1222, and the coupling members 123 may be directly coupled to the side surfaces of the seating part 1221. In this case, in a state in which the side portions 1212 of the emitter 121 are disposed on the side surfaces of the seating part 1221, when the coupling members 123 pass through the side portions 1212 of the emitter 121 to be coupled to the side surfaces of the seating part 1221, the emitter 121 may be fixed to the holder 122.

The seating part 1221 and the fixing parts 1222 of the holder 122 may be formed as separate members. In this case, since the seating part 1221 and the fixing parts 1222 may each be manufactured in the form of a box, it may be easy to manufacture each member. Alternatively, the seating part 1221 and the fixing parts 1222 of the holder 122 may be integrally formed. In this case, since a separate process of aligning the fixing parts 1222 with respect to the seating part 1221 may not be necessary, the process of fixing the emitter 121 to the holder 122 may be facilitated.

As long as the electron emission portion 1211 of the emitter 121 may be disposed along a plane perpendicular to the electron emission direction x, the present disclosure is not limited to the above-described structure of the holder 122, and the emitter 121 may be formed in a variety of ways. For example, the emitter 121 may be coupled to the holder 122 through a separate mechanical mechanism, may be attached to the holder 122 through an adhesive, or may be fixed to the holder 122 through a welding method.

Figure 6A:
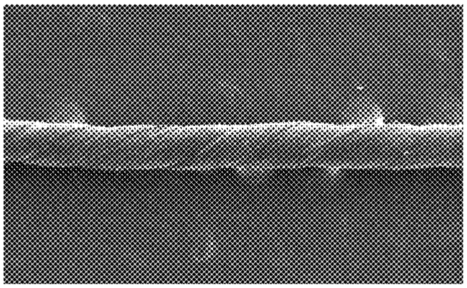
FIGS. 6A and 6B shows photographs capturing a linear emitter of the field emission assembly according to one example embodiment of the present disclosure.
Figure 6B:
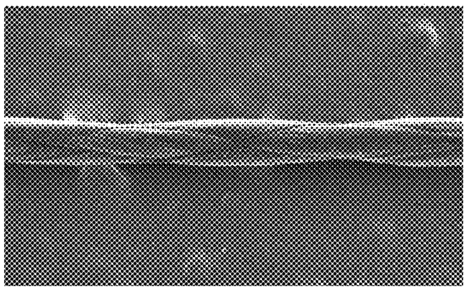

FIGS. 6A and 6B shows photographs capturing a linear emitter of the field emission assembly according to one example embodiment of the present disclosure. FIGS. 7A to 7D is a diagram illustrating a formation process of an emitter of the field emission assembly according to one example embodiment of the present disclosure.

Referring to FIGS. 6A and 6B, the emitter 121 may be formed by weaving a plurality of linear yarns formed of a CNT material. Referring to FIG. 6A, each of the plurality of yarns 121*a* constituting the emitter 121 may be a twisted yarn. In this case, since the yarn 121*aa* may be manufactured more easily, manufacturing efficiency may be improved. In addition, referring to FIG. 6B, each of the plurality of yarns 121*a* constituting the emitter 121 may be a braided yarn. In this case, since mechanical and electrical properties of the yarn 121*a* may be improved, a field emission characteristic may also be improved. The physical properties of the twisted yarn and the braided yarn will be described below in detail with reference to FIGS. 8A to 8D, 9 and 10.

FIGS. 7A to 7D shows in detail a process of forming the emitter 121 of the field emission assembly 120 according to one embodiment of the present disclosure.

Figure 7A:
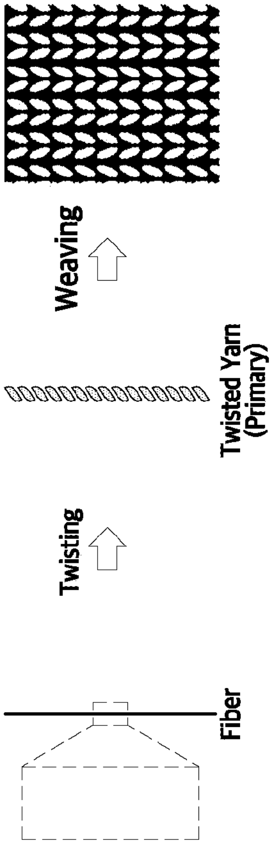
FIGS. 7A to 7D is a diagram illustrating a formation process of an emitter of the field emission assembly according to one example embodiment of the present disclosure.
Figure 7B:
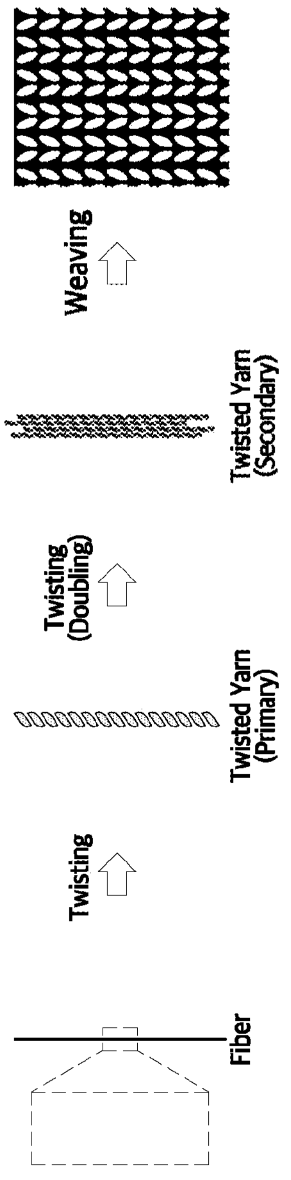

Referring to FIGS. 7A and 7B, each of the plurality of yarns 121*a* constituting the emitter 121 may be a twisted yarn. In this case, referring to FIG. 7A, the twisted yarn constituting the yarn 121*a* may be a primary twisted yarn formed by twisting a plurality of CNT fibers. In addition, referring to FIG. 7B, the twisted yarn constituting yarn 121*a* may be a secondary twisted yarn formed by twisting the primary twisted yarns with each other. In this case, the primary twisted yarn may be formed by twisting a plurality of CNT fibers.

Figure 7C:
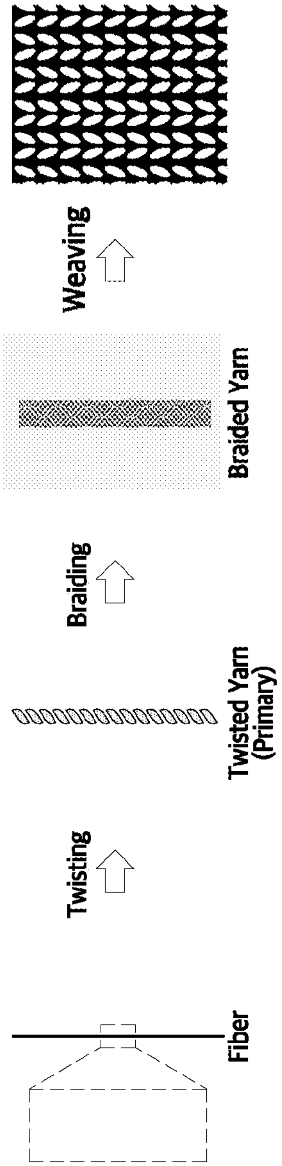
Figure 7D:
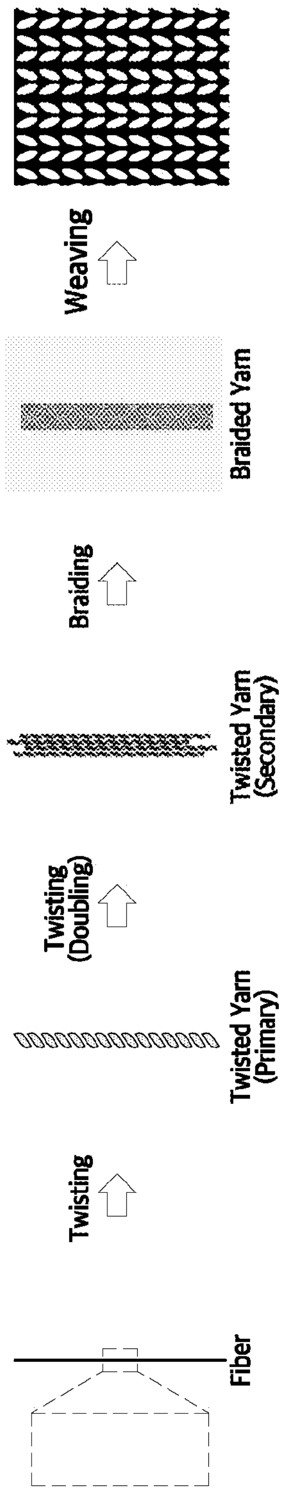

Meanwhile, referring to FIGS. 7C and 7D, each of the plurality of yarns 121*a* constituting the emitter 121 may be a braided yarn. In this case, referring to FIG. 7C, the braided yarn constituting the yarn 121*a* may be formed by braiding a plurality of the primary twisted yarns, and the primary twisted yarn may be formed by twisting a plurality of CNT fibers. In addition, referring to FIG. 7D, the braided yarn constituting the yarn 121*a* may be formed by braiding the secondary twisted yarns with each other. In this case, the secondary twisted yarn may be formed by twisting a plurality of the primary twisted yarns, and the primary twisted yarn may be formed by twisting a plurality of CNT fibers.

However, when it is possible to form the linear yarn 121*a* capable of forming the emitter 121 in the form of a sheet by weaving, the method of forming the yarn 121*a* constituting the emitter 121 is not limited to the method described in FIGS. 7A to 7D, and the emitter 121 may be formed according to a required field emission characteristic in various combinations of the methods shown in FIG. 7A to 7D or may be formed in a method not described in FIGS. 7A to 7D.

Figure 8A:
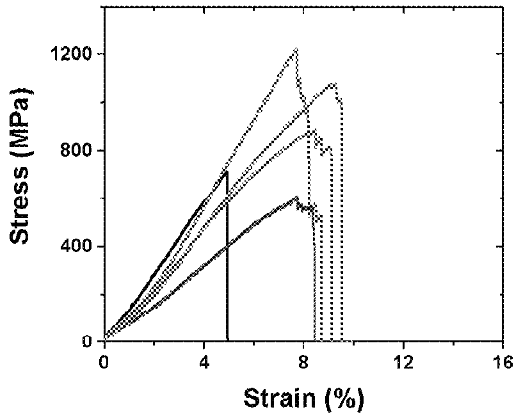
FIGS. 8A to 8D is a diagram illustrating a mechanical property according to a type of a yarn constituting the emitter.
Figure 8B:
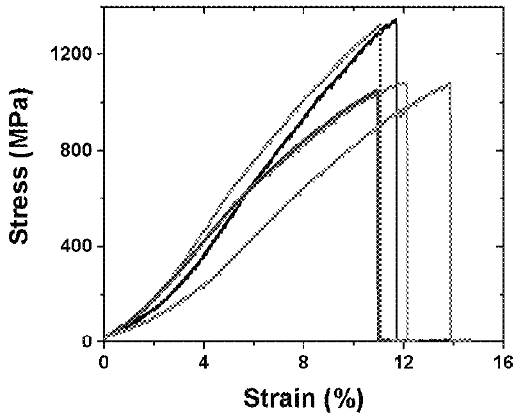
Figure 8C:
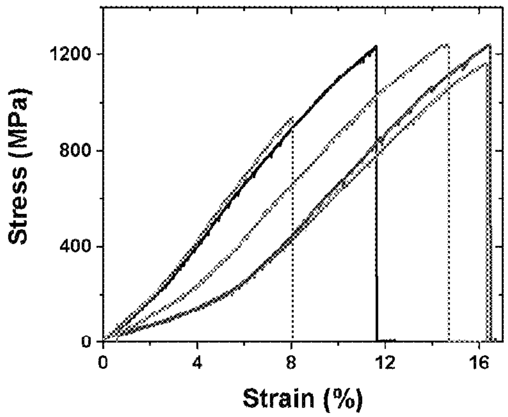
Figure 8D:
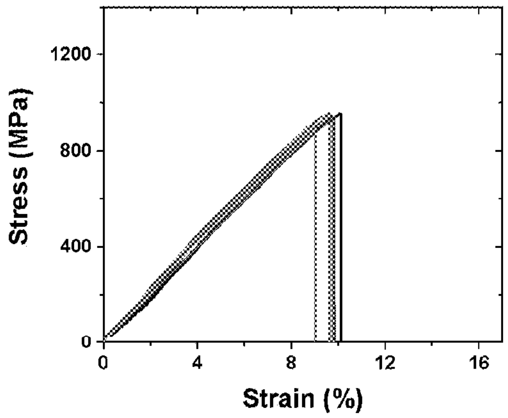

FIGS. 8A to 8D is a diagram illustrating a mechanical property according to a type of a yarn constituting the emitter FIGS. 8A to 8D show a strain-stress curve according to a type of a yarn constituting the emitter and illustrate data after an experiment was performed a plurality of times for each case. FIG. 8A shows a case in which a strain is applied to a yarn (Non-Twisted Yarn_64 Fiber) in which 64 CNT fibers were simply collected, FIG. 8B shows a case in which a strain is applied to a twisted yarn (75 Twisted Yarn 64 Fiber) formed by twisting 64 CNT fibers 75 times, FIG. 8C shows a case in which a strain is applied to a twisted yarn (150 Twisted Yarn_64 Fiber) formed by twisting 64 CNT fibers 150 times, and FIG. 8D shows a case in which a strain is applied to a braided yarn (Braided Yarn 64 Fiber) formed by braiding 64 CNT fibers.

Referring to FIGS. 8A to 8C, when the strain was applied to the simply collected CNT fibers (the non-twisted yarn) and to the twisted yarn formed by twisting CNT fibers, it can be seen that a different stress characteristic exhibited at each experiment. On the other hand, referring to FIG. 8D, when the strain was applied to the braided yarn formed by braiding CNT fibers, it can be seen that there is almost no difference in the stress characteristic at each experiment.

The following Table 1 shows the numerical representation of mechanical properties according to the types of yarns constituting the above-described emitter.

TABLE 1

| | Strain (%) | Stress (MPa) | Modulus (GPa) |
|---|---|---|---|
| Non-Twisted Yarn | 7.62 ± 1.47 | 901.5 ± 227.0 | 9.16 ± 2.05 |
| 75 Twisted Yarn | 11.94 ± 1.06 | 1177.0 ± 130.1 | 6.15 ± 1.35 |
| 150 Twisted Yarn | 13.51 ± 3.07 | 1163.9 ± 116.2 | 5.34 ± 2.43 |
| Braided Yarn | 9.67 ± 0.36 | 935.8 ± 26.5 | 9.55 ± 1.06 |

Referring to Table 1, it can be seen that the deviation value of strain and stress were significantly lower in a case in which the yarn constituting the emitter was formed of the braided yarn than other cases. In addition, even when looking at the value of a change ratio (Modulus) of stress according to strain, it can be confirmed that a case in which the yarn constituting the emitter was formed of the (braided yarn has the smallest deviation value when compared to other cases.

Referring to FIGS. 8A to 8D and Table 1, when the yarn constituting the emitter was formed of the braided yarn, the uniformity of mechanical properties may be improved when compared to the simply collected CNT fibers (the non-twisted yarn) or to the yarn formed of the twisted yarn. In this way, since errors due to differences in the mechanical properties of the emitter may be reduced in the process of forming the field emission assembly, the uniformity of the field emission characteristics may also be improved.

Figure 9:
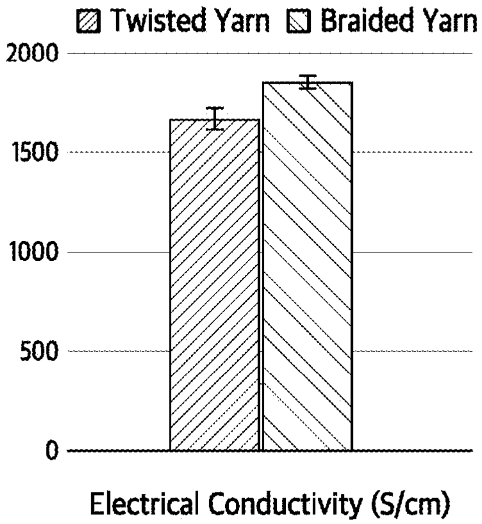
FIG. 9 is a graph illustrating electrical properties when an emitter is formed of a twisted yarn and when the emitter is formed of a braided yarn.

FIG. 9 is a graph illustrating electrical properties when an emitter is formed of a twisted yarn and when the emitter is formed of a braided yarn.

Specifically, FIG. 9 shows electrical conductivity according to the type of yarn constituting the emitter.

The following Table 2 numerically expresses average values (avg) and population standard deviation values (std.p) of the electrical properties of emitters when the emitter is formed of the twisted yarn and when the emitter is formed of the braided yarn.

TABLE 2

| | Electrical conductivity (S/cm) | |
|---|---|---|
| | avg | std.p |
| Twisted Yarn | 1670.8 | 53.6 |
| Braided Yarn | 1855.3 | 27.8 |

Referring to FIG. 9 and Table 2, when the emitter is formed of braided yarn, it can be seen that the avg of the electric conductivity characteristic was higher, and the stp.d thereof was smaller when compared to a case in which the emitter is formed of the twisted yarn. That is, when the emitter is formed based on the braided yarn, the uniformity of electrical conductivity may be further improved so that the uniformity of the field emission characteristic of the emitter may also be improved.

Figure 10:
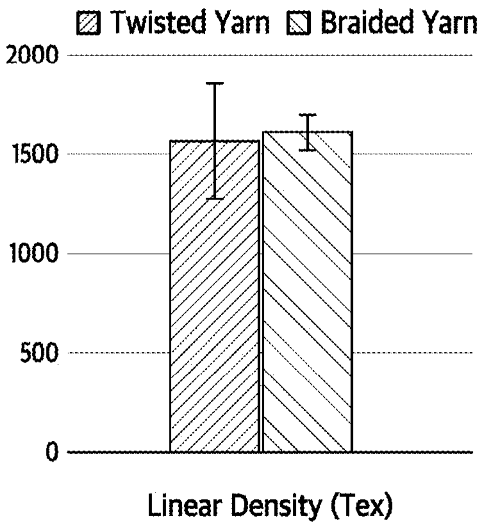
FIG. 10 is a graph illustrating linear densities when an emitter is formed of a twisted yarn and when the emitter is formed of a braided yarn.

FIG. 10 is a graph illustrating a linear density when an emitter is formed of a twisted yarn and when the emitter is formed of a braided yarn.

The following Table 3 numerically expresses average values (avg) and population standard deviation values (std.p) of the linear densities of emitters when the emitter is formed of the twisted yarn and when the emitter is formed of the braided yarn.

TABLE 3

| | Linear density (Tex) | |
|---|---|---|
| | avg | std.p |
| Twisted Yarn | 15.67 | 2.9 |
| Braided Yarn | 16.11 | 0.68 |

Referring to FIG. 10 and Table 3, when the emitter is formed of the braided yarn, it can be confirmed that the stp.d of the linear density is smaller than that of the twisted yarn. Since an amount of a current flowing through the emitter or resistance of the emitter may be varied when the linear density is changed, it can be understood that the more uniform the linear density, the more uniform the electrical characteristic. That is, when the emitter is formed of the braided yarn, the uniformity of the linear density is excellent, and thus the electrical property may also be uniform so that the uniformity of the field emission property may also be improved.

In accordance with the present disclosure, it is possible to improve the uniformity of a field emission characteristic in an emitter.

In addition, due to the uniformity of the field emission, controlling of a generation amount or an intensity of electromagnetic waves can be more precisely performed.

In addition, durability of the emitter may be improved, and thus an emitter, a field emission assembly, and an electromagnetic wave generator including the same may each have a consistent lifetime.

Any or other example embodiments of the present disclosure described above are not mutually exclusive or distinct. Any of the above-described example embodiments or other example embodiments of the present disclosure may be mixed or combined in each configuration or each function.

For example, it means that a configuration A described in a specific embodiment and/or drawings may be combined with a configuration B described in other embodiments and/or drawings. That is, even when a coupling between components is not directly described, it means that the coupling is possible except for a case in which it is described that the coupling is impossible.

The above detailed description should not be construed as restrictive in all respects and should be considered as illustrative. The scope of the present disclosure should be determined by a reasonable interpretation of the appended claims, and all modifications within the equivalent scope of the present specification are included in the scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A field emission assembly, comprising
an emitter configured to emit electrons; and
a holder configured to fix the emitter,
wherein the emitter is in the form of a sheet in which a plurality of yarns including carbon nanotube (CNT) fibers are weaved,
wherein the emitter includes an electron emission portion which is a region spread on a plane perpendicular to the electron emission direction, and side portions formed on both sides of the electron emission portion,
wherein the holder includes a seating part on which the emitter is seated, and fixing parts disposed on both sides of the seating part,
wherein the electron emission portion is seated on a front surface of the seating part in the electron emission direction, and
wherein the side portions are disposed in gaps formed between the seating part and the fixing parts while surrounding the seating part.

2. The field emission assembly of claim 1, wherein each of the plurality of yarns is a braided yarn.

3. The field emission assembly of claim 2, wherein:
the braided yarn is formed by braiding a plurality of primary twisted yarns; and
the primary twisted yarn is formed by twisting a plurality of CNT fibers.

4. The field emission assembly of claim 2, wherein:
the braided yarn is formed by braiding a plurality of secondary twisted yarns;
the secondary twisted yarn is formed by twisting a plurality of primary twisted yarns, and the primary twisted yarn is formed by twisting a plurality of CNT fibers.

5. The field emission assembly of claim 1, wherein each of the plurality of yarns is a twisted yarn.

6. The field emission assembly of claim 5, wherein the twisted yarn is the primary twisted yarn formed by twisting a plurality of CNT fibers.

7. The field emission assembly of claim 5, wherein:
the twisted yarn is the secondary twisted yarn formed by twisting primary twisted yarns with each other; and
the primary twisted yarn is formed by twisting a plurality of CNT fibers.

8. The field emission assembly of claim 1, wherein the front surface of the seating part in the electron emission direction is perpendicular to the electron emission direction.

9. The field emission assembly of claim 1, further comprising:
coupling members configured to pass through the fixing parts in a lateral direction,
wherein the emitter is fixed to the holder by pressurizing the side portions by the coupling members and side surfaces of the seating part.

10. An electromagnetic wave generator, comprising
a field emission assembly including an emitter configured to emit electrons and a holder configured to fix the emitter; and
an anode in which electrons emitted from the field emission assembly collide to generate electromagnetic waves,
wherein the emitter is in the form of a sheet in which a plurality of yarns including carbon nanotube (CNT) fibers are weaved,
wherein the emitter includes an electron emission portion which is a region spread on a plane perpendicular to the electron emission direction, and side portions formed on both sides of the electron emission portion,
wherein the holder includes a seating part on which the emitter is seated, and fixing parts disposed on both sides of the seating part,
wherein the electron emission portion is seated on a front surface of the seating part in the electron emission direction, and
wherein the side portions are disposed in gaps formed between the seating part and the fixing parts while surrounding the seating part.

11. The electromagnetic wave generator of claim 10, wherein the emitter includes an electron emission portion extending on a plane perpendicular to a direction toward the anode.

12. The electromagnetic wave generator of claim 10, wherein the electromagnetic wave has a wavelength ranging from 0.001 nm to 10 nm.

13. The electromagnetic wave generator of claim 10, wherein each of the plurality of yarns is a braided yarn.

14. The electromagnetic wave generator of claim 13, wherein:
the braided yarn is formed by braiding a plurality of primary twisted yarns; and
the primary twisted yarn is formed by twisting a plurality of CNT fibers.

15. The electromagnetic wave generator of claim 13, wherein:
the braided yarn is formed by braiding a plurality of secondary twisted yarns;
the secondary twisted yarn is formed by twisting a plurality of primary twisted yarns, and
the primary twisted yarn is formed by twisting a plurality of CNT fibers.

16. The electromagnetic wave generator of claim 10, wherein each of the plurality of yarns is a twisted yarn.

17. The electromagnetic wave generator of claim 16, wherein the twisted yarn is the primary twisted yarn formed by twisting a plurality of CNT fibers.

18. The electromagnetic wave generator of claim 16, wherein:
the twisted yarn is the secondary twisted yarn formed by twisting primary twisted yarns with each other; and
the primary twisted yarn is formed by twisting a plurality of CNT fibers.

19. The electromagnetic wave generator of claim 10, wherein the front surface of the seating part in the electron emission direction is perpendicular to the electron emission direction.

20. The electromagnetic wave generator of claim 10, further comprising:
coupling members configured to pass through the fixing parts in a lateral direction,
wherein the emitter is fixed to the holder by pressurizing the side portions by the coupling members and side surfaces of the seating part.

* * * * *